(12) United States Patent
Wang et al.

(10) Patent No.: US 9,257,146 B1
(45) Date of Patent: Feb. 9, 2016

(54) DATA STORAGE DEVICE COMPRISING SEQUENCE DETECTOR COMPENSATING FOR INTER-TRACK INTERFERENCE

(71) Applicant: Western Digital Technologies, Inc., Irvine, CA (US)

(72) Inventors: Alvin J. Wang, Fremont, CA (US); Shafa Dahandeh, Laguna Niguel, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 41 days.

(21) Appl. No.: 14/178,155

(22) Filed: Feb. 11, 2014

(51) Int. Cl.
*G11B 5/09* (2006.01)
*G11B 20/18* (2006.01)

(52) U.S. Cl.
CPC .................................... *G11B 20/18* (2013.01)

(58) Field of Classification Search
None
See application file for complete search history.

(56) References Cited

U.S. PATENT DOCUMENTS

| | | | |
|---|---|---|---|
| 5,229,901 A | 7/1993 | Mallary | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,154,335 A | 11/2000 | Smith et al. | |
| 6,157,510 A | 12/2000 | Schreck et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |

(Continued)

OTHER PUBLICATIONS

T. Losuwan, C. Warisarn, P. Supnithi, and P. Kovintavewat, "A Study of 2D detection for Two-Dimensional Magnetic Recording," in Proc. of ITC-CSCC 2012, Jul. 15-18, 2012, Sapporo, Japan.

(Continued)

*Primary Examiner* — Regina N Holder

(57) ABSTRACT

A data storage device is disclosed comprising a head actuated over a disk comprising a plurality of data tracks. A first data track is read to generate a first read signal, the first read signal is sampled to generate first read signal samples, a first data sequence is detected based on the first read signal samples, and the first data sequence is converted into corresponding first expected samples. A second data track adjacent the first data track is read to generate a second read signal, the second read signal is sampled to generate second read signal samples, and a second data sequence is detected based on the second read signal samples and the first expected samples.

23 Claims, 6 Drawing Sheets

(56) References Cited

U.S. PATENT DOCUMENTS

| | | |
|---|---|---|
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,140 B2 | 11/2004 | Brommer et al. |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |

(56) References Cited

U.S. PATENT DOCUMENTS

| | | |
|---|---|---|
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,549 B2 | 9/2006 | Asakura |
| 7,106,947 B2 | 9/2006 | Boyle et al. |
| 7,110,202 B1 | 9/2006 | Vasquez |
| 7,111,116 B1 | 9/2006 | Boyle et al. |
| 7,111,225 B2 | 9/2006 | Coene et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,259,927 B2 | 8/2007 | Harris |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |

(56) References Cited

U.S. PATENT DOCUMENTS

| | | |
|---|---|---|
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,300,339 B1 | 10/2012 | Nangare et al. |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,750 B1 | 5/2013 | Nangare et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,578,253 B2 | 11/2013 | Yang et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,508 B1 | 12/2013 | Burd |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,773,793 B1 * | 7/2014 | McFadyen ............... 360/41 |
| 2007/0085709 A1 | 4/2007 | Coene et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0063022 A1 | 3/2012 | Mathew et al. |
| 2012/0105994 A1 | 5/2012 | Bellorado et al. |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0027801 A1 | 1/2013 | Kumar et al. |
| 2013/0223199 A1 | 8/2013 | Lund et al. |
| 2014/0160590 A1 * | 6/2014 | Sankaranarayanan et al. . 360/45 |

OTHER PUBLICATIONS

Alvin J. Wang, et al. U.S. Appl. No. 14/089,912, filed Nov. 26, 2013, 19 pages.

* cited by examiner

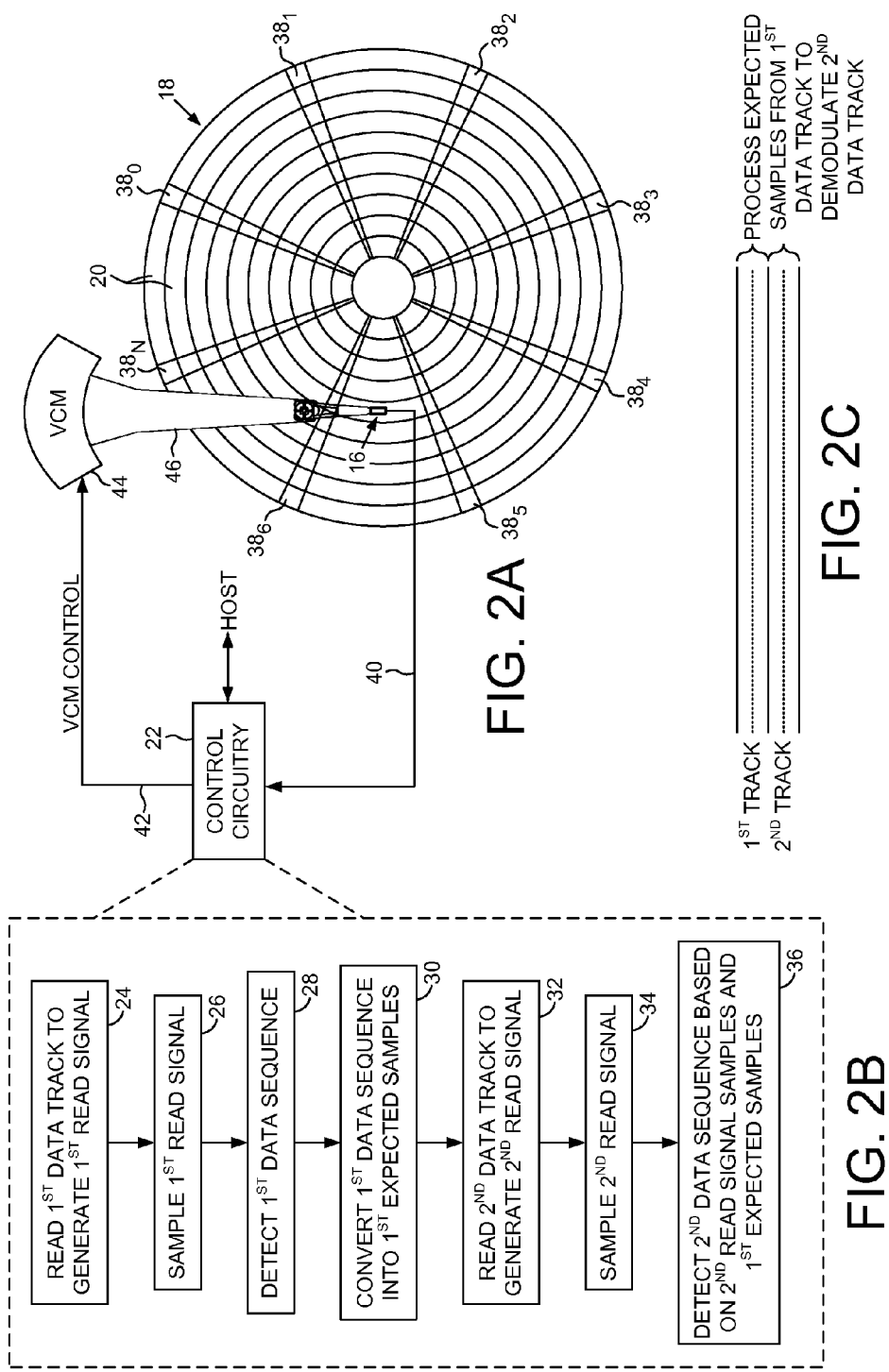

DATA STORAGE DEVICE COMPRISING SEQUENCE DETECTOR COMPENSATING FOR INTER-TRACK INTERFERENCE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to data sectors within a data track by modulating the write current of a write element, for example, using a non-return to zero (NRZ) signal, thereby writing magnetic transitions onto the disk surface. A read element (e.g., a magnetoresistive (MR) element) is then used to transduce the magnetic transitions into a read signal that is demodulated by a read channel. The recording and reproduction process may be considered a communication channel, wherein communication demodulation techniques may be employed to demodulate the read signal.

When reading data from the disk, a read channel typically samples the read signal to generate read signal samples that are equalized according to a target response (e.g., a partial response). A sequence detector (e.g., a Viterbi detector) detects an estimated data sequence from the equalized samples, and errors in the estimated data sequence are corrected, for example, using a Reed-Solomon error correction code (ECC) or using a Low Density Parity Check (LDPC) code.

BRIEF DESCRIPTION OF THE DRAWINGS

FIG. 2A shows a data storage device in the form of a disk drive according to an embodiment comprising a head actuated over a disk comprising a plurality of data tracks.

FIG. 2B is a flow diagram according to an embodiment wherein a first data sequence detected from reading a first data track is used to detect a second data sequence when reading a second, adjacent data track.

FIG. 2C illustrates expected samples generated from the first data sequence being used to detect the second data sequence recorded in the second, adjacent data track.

DETAILED DESCRIPTION

Figure 1:
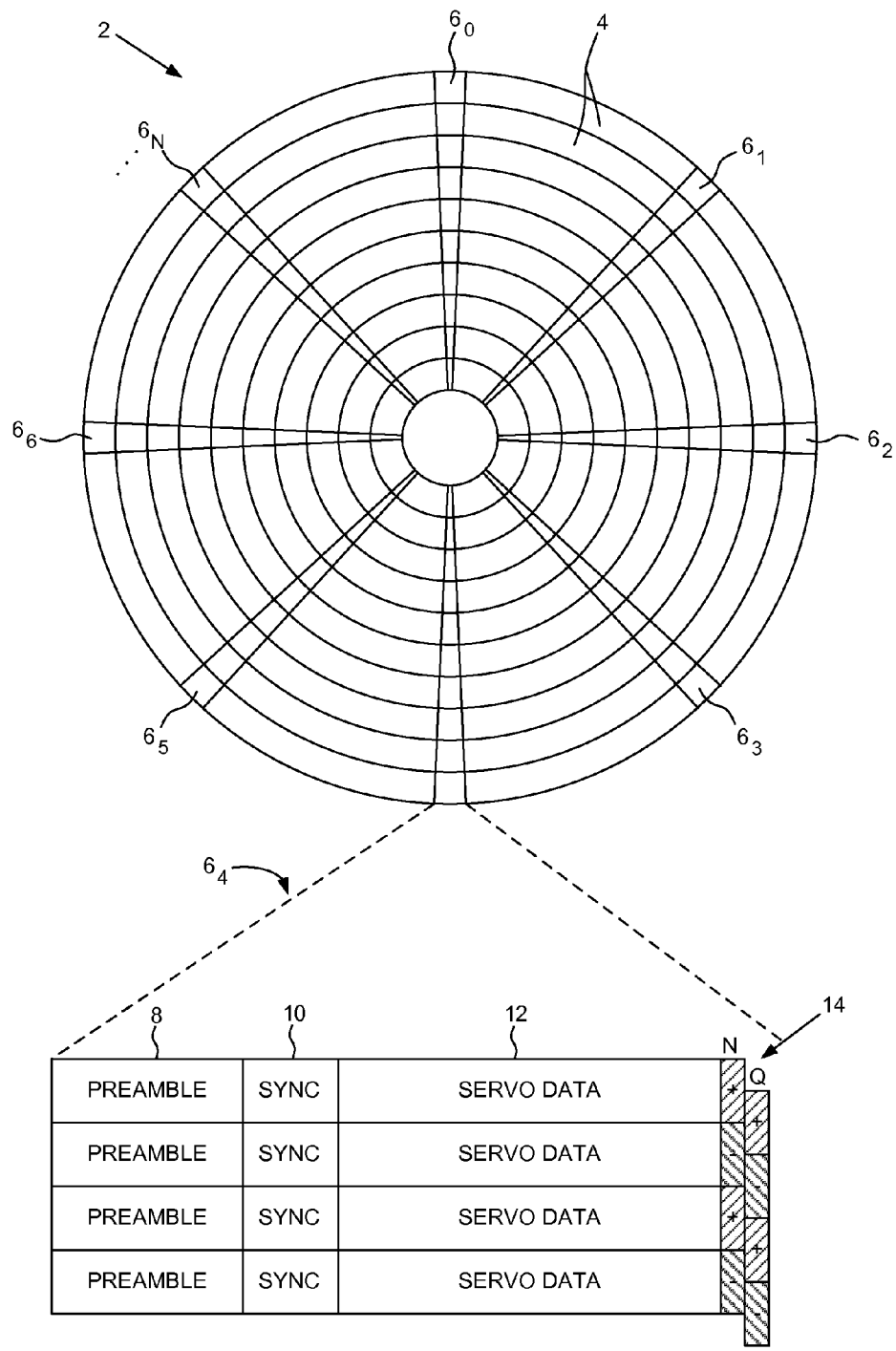
FIG. 1 shows a prior art disk format comprising a plurality of servo tracks defined by servo sectors.

FIG. 2A shows a data storage device in the form of a disk drive according to an embodiment comprising a head 16 actuated over a disk 18 comprising a plurality of data tracks 20. The disk drive further comprises control circuitry 22 configured to execute the flow diagram of FIG. 2B, wherein a first data track is read (FIG. 2C) to generate a first read signal (block 24), the first read signal is sampled to generate first read signal samples (block 26), a first data sequence is detected based on the first read signal samples (bock 28), and the first data sequence is converted into corresponding first expected samples (block 30). A second data track adjacent the first data track is read (FIG. 2C) to generate a second read signal (block 32), the second read signal is sampled to generate second read signal samples (block 34), and a second data sequence is detected based on the second read signal samples and the first expected samples (block 36).

In the embodiment of FIG. 2A, a plurality of concentric servo tracks are defined by embedded servo sectors $38_0$-$38_N$, wherein the concentric data tracks 20 are defined relative to the servo tracks at the same or different radial density. The control circuitry 22 processes a read signal 40 emanating from the head 16 to demodulate the servo sectors and generate a position error signal (PES) representing an error between the actual position of the head and a target position relative to a target track. The control circuitry 22 filters the PES using a suitable compensation filter to generate a control signal 42 applied to a voice coil motor (VCM) 44 which rotates an actuator arm 46 about a pivot in order to actuate the head 16 radially over the disk 18 in a direction that reduces the PES. The servo sectors $38_0$-$38_N$ may comprise any suitable head position information, such as a track address for coarse positioning and servo bursts for fine positioning. The servo bursts may comprise any suitable pattern, such as an amplitude based servo pattern or a phase based servo pattern.

Figure 3A:
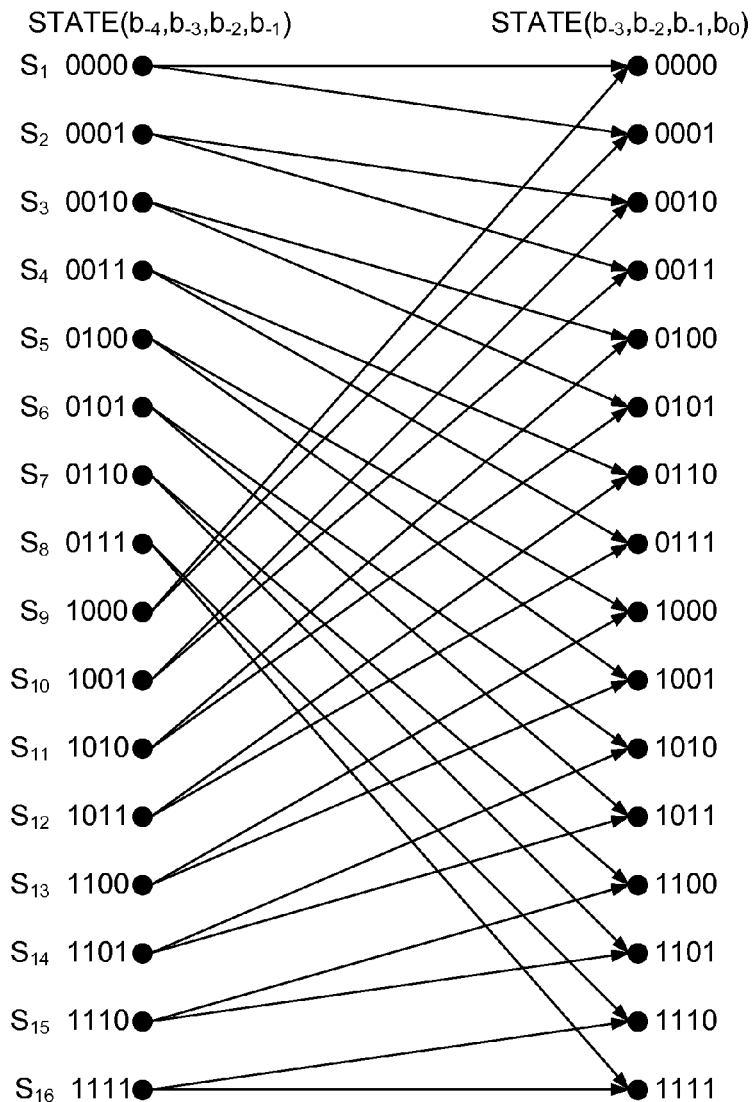
FIG. 3A shows a state transition diagram for an example sixteen state trellis type sequence detector.

The data is typically recorded in a data track using partial response signaling meaning that the waveform response of each recorded bit overlaps with the waveform response of one or more of the linear adjacent bits resulting in a controlled amount of downtrack interference (DTI) in the read signal (also referred to as intersymbol interference (ISI)). Demodulating the read signal involves sampling the read signal and estimating a data sequence based on the likelihood that the read signal samples correspond to the expected samples of a possible data sequences. To facilitate this demodulation, a trellis type sequence detector is typically employed comprising a state machine that corresponds to the possible data sequences based on the length of the DTI (number of bits affected). FIG. 3A shows an example state transition diagram for a sixteen state trellis that corresponds to a DTI length of four bits. At any given state, a branch metric is computed (e.g., a Euclidean metric) representing a likelihood of the next downtrack bit being a "0" or a "1". As the bits in the read signal are evaluated, a number of survivor sequences are tracked through the corresponding trellis which eventually merge into a most likely data sequence based on the accumulated branch metrics for each survivor sequence.

Figure 3B:
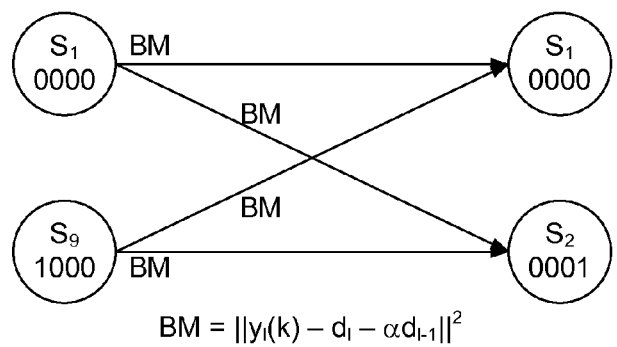
FIG. 3B shows an embodiment wherein the branch metrics for the trellis states are generated based on the expected samples generated from the first data sequence.

As the data tracks 20 are squeezed closer together in an attempt to increase the capacity of the disk 18, the data bits recorded in the adjacent data tracks may induce an intertrack interference (ITI) in the read signal of a target track. Accordingly, in one embodiment a trellis type sequence detector is employed that takes into account the intertrack interference caused by the data sequence recorded in at least one adjacent data track. FIG. 3B illustrates an example embodiment wherein the branch metric (BM) computed for each state of the state transition diagram is computed based on the expected samples of a data sequence detected from an adjacent data track. In this example, the BM is computed as a Euclidean metric:

$$BM = \|y_l(k) - d_l - \alpha d_{l-1}\|^2$$

where $y_l(k)$ represents the current read signal sample, $d_l$ represents an expected sample corresponding to the branch, and $d_{l-1}$ represents an expected sample corresponding to a bit in a data sequence detected in the adjacent data track preceding the target data track. In an embodiment described below, the BM may also be computed based on an expected sample of a data sequence detected in the adjacent data track following the target data track.

In the above Euclidean metric equation, the expected sample $d_{l-1}$ of the adjacent data track is scaled by a scalar $\alpha$ to account for the degree the ITI affects the read signal sample of the target data track as determined by the radial spacing of the adjacent data track relative to the target data track. That is, the scalar $\alpha$ increases as the spacing between the data tracks decreases. In one embodiment, the scalar $\alpha$ may be calibrated during a manufacturing procedure, and/or tuned during normal read operations such as during retry operations. For example, the scalar $\alpha$ may be tuned relative to a suitable quality metric, such as a bit error rate of the sequence detector. In one embodiment, the spacing of the data tracks may vary over the radius of the disk, and/or the spacing between the read elements may change as the skew angle of the head changes, and therefore the scalar $\alpha$ may be calibrated and then configured during normal read operations based on the radial location of the head.

Figure 4A:
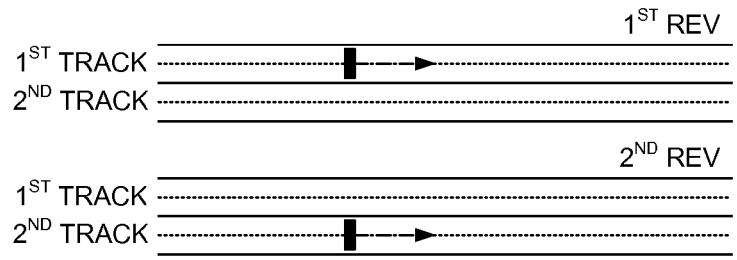
FIG. 4A shows an embodiment wherein the first data sequence is detected during a first revolution of the disk and the second data sequence is detected during a second revolution of the disk by reading the first and second data tracks using a single read element.
Figure 4B:
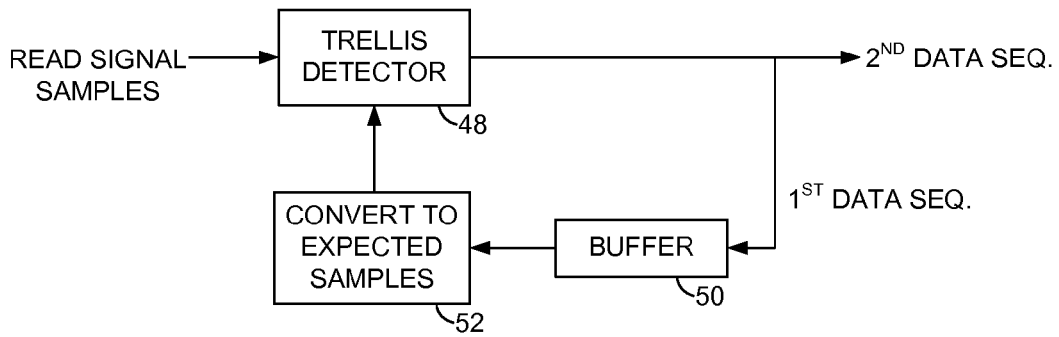
FIG. 4B shows control circuitry according to an embodiment wherein the first data sequence is buffered and then converted into expected samples used by a trellis type sequence detector to detect the second data sequence.

The expected samples of the data sequence detected in an adjacent data track may be generated in any suitable manner. In one embodiment shown in FIG. 4A, the head 16 comprises a single read element that may be positioned over a first data track during a first revolution of the disk 18. As shown in FIG. 4B, a DTI trellis type sequence detector 48 may process the resulting read signal samples to detect a first data sequence that is stored in a buffer 50. In this embodiment, the ITI of the adjacent data tracks is not accounted for by the DTI trellis type sequence detector 48 since the data sequence of the adjacent data tracks is unknown. Accordingly, it may require multiple revolutions of the disk 18 in order to accurately detect the first data sequence using any suitable data recovery technique, such as tuning read channel parameters, averaging the read signal samples of multiple disk revolutions, or employing track level redundancy (e.g., a parity data sector).

Once the first data sequence of the first data track is accurately detected and stored in the buffer 50, the read element is positioned over a second data track during a second revolution of the disk 18 and the resulting read signal samples are processed by a DTI and ITI trellis type sequence detector 48. The first data sequence is read from the buffer 50 and converted at block 52 into corresponding expected samples processed by the DTI and ITI trellis type sequence detector 48 to generate the branch metrics such as described above with reference to FIG. 3B. Because the ITI is taken into account when reading the second data track, the accuracy of the detected data sequence improves leading to fewer revolutions needed to recover the recorded data (i.e., the recorded data may be recovered from the second data track typically within a single disk revolution).

Figure 4C:
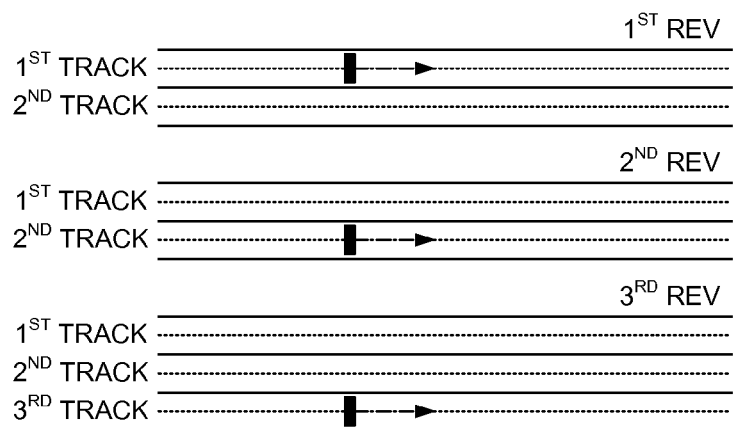
FIG. 4C shows an embodiment wherein the second data sequence is used to detect a third data sequence when reading a third data track.

In one embodiment, data may be recorded on the disk in a long sequence of consecutive data tracks, such as when recording streaming data or other large data files. Accordingly, when reading the consecutive data tracks the data sequence detected in a preceding data track may be converted into expected samples and used to detect the data sequence recorded in a current data track. This embodiment is illustrated in FIG. 4C wherein after detecting the data sequence recorded in the second data track using the expected samples of the first data track, the head 16 may be positioned over a third, consecutive data track. The data sequence detected in the second data track may then be converted into corresponding expected samples and processed by the DTI and ITI trellis type sequence detector 48 to detect the data sequence recorded in the third data track. This process may be repeated while reading each new consecutive data track.

The detected data sequence stored in the buffer 50 of FIG. 4B may be converted into the corresponding expected samples at block 52 in any suitable manner. In one embodiment, the expected samples may be generated by filtering the detected data sequence with the target partial response of the read channel. The resulting expected samples represents the response of a noiseless read channel to the recorded data sequence. In other embodiments, the expected samples may be generated by processing the detected data sequence using a state transition diagram such as shown in FIG. 3A.

Figure 5A:
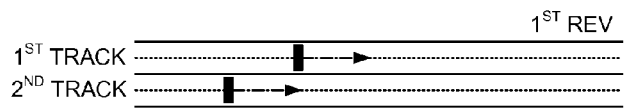
FIG. 5A shows an embodiment wherein the first data track is read with a first read element and a second data track is read with a second read element during a single revolution of the disk.
Figure 5B:
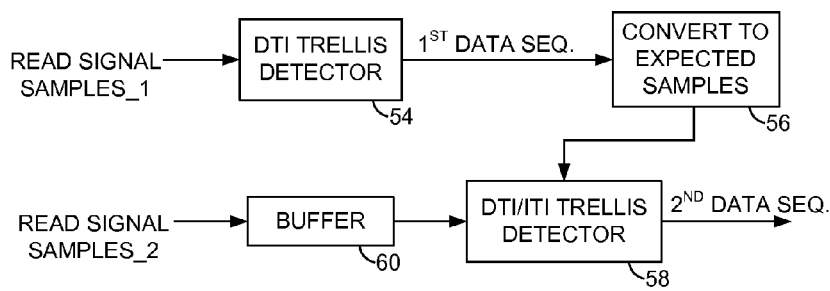
FIG. 5B shows control circuitry according to an embodiment wherein a downtrack interference (DTI) trellis type sequence detector is used to detect the first data sequence and a DTI and intertrack interference (ITI) trellis type sequence detector is used to detect the second data sequence.

FIG. 5A shows an embodiment wherein the head 16 comprises a first read element positioned over a first data track and a second read element positioned over a second data track. A first read signal emanating from the first read element is sampled to generate first read signal samples processed by a DTI trellis type sequence detector 54 (FIG. 5B) configured to detect a first data sequence that is converted by block 56 into corresponding expected samples. A second read signal emanating from the second read element is sampled to generate second read signal samples processed by a DTI and ITI trellis type sequence detector 58 to detect a second data sequence. The DTI and ITI trellis type sequence detector 58 also processes the expected samples of the first data sequence to compensate for the ITI of the first data track. In the embodiment of FIG. 5B, the second read signal samples are buffered 60 to account for the delay in detecting the first data sequence. That is, the DTI trellis type sequence detector 54 has a detection delay before the survivor sequences of the trellis merge into a single survivor sequence, and therefore the buffer 60 provides a corresponding delay in the second read signal samples before being input into the DTI and ITI trellis type sequence detector 58.

In one embodiment, the DTI trellis type sequence detector 54 may be less accurate since it does not compensate for the ITI of the second data track. Therefore there may be errors in the first data sequence that may reduce the accuracy of the DTI and ITI trellis type sequence detector 58 since the corresponding expected samples will be incorrect. Accordingly, in one embodiment the DTI trellis type sequence detector 54 may output a quality metric (soft decision) with each bit detected in the first data sequence, where the quality metric indicates a likelihood as to whether the detected bit in the first data sequence is correct. When the quality metric is below a threshold, in one embodiment the scalar $\alpha$ for generating the branch metric in the DTI and ITI trellis type sequence detector 58 may be set to zero so that the expected sample does not affect the branch metric calculation.

In one embodiment, the recorded data in both the first and second data tracks of FIG. 5A may be accurately detected during a single revolution of the disk. That is, the DTI trellis type sequence detector 54 may operate well enough so that the first data sequence is accurately detected even though the ITI from the second data track is not compensated. However if the first data sequence cannot be accurately detected during the first revolution of the disk, whereas the second data sequence is accurately detected due to compensating for the ITI from the first data track, in one embodiment the second data sequence may be used to recover the first data sequence during a second revolution of the disk. That is, during a second revolution of the disk the second data sequence is converted into corresponding expected samples processed by a DTI and ITI trellis type sequence detector configured to detect the first data sequence representing the data recorded in the first data track.

Figure 5C:
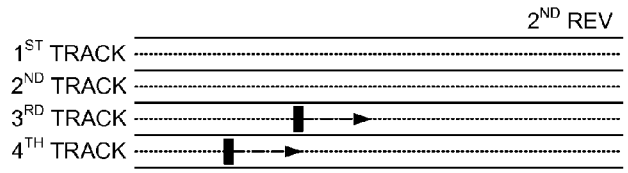
FIG. 5C shows an embodiment wherein a third data sequence may be detected when reading a third data track using expected samples generated from the second data sequence and using expected samples generated by reading a fourth, adjacent data track.
Figure 5D:
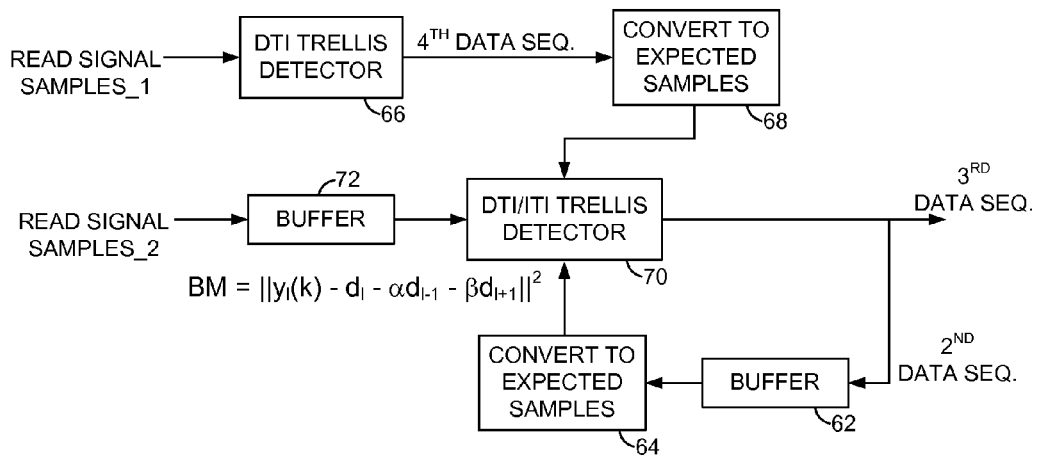
FIG. 5D shows control circuitry according to an embodiment for detecting the third data sequence using expected samples generated from the second data sequence and using expected samples generated by reading a fourth, adjacent data track.

FIG. 5C illustrates an embodiment wherein after detecting the data recorded in the second data track, the first read element may be positioned over a third data track and the second read element may be positioned over a fourth data track. The second data sequence may be stored in buffer 62 and converted into expected samples by block 64. A DTI trellis type sequence detector 66 may process the read signal samples from the fourth data track to generate a fourth data sequence converted into expected samples by block 68. A DTI and ITI trellis type sequence detector 70 processes the read signal samples of the third data track (after being delayed by buffer 72) as well as the expected samples corresponding to the detected data sequences of the adjacent data tracks (the second and fourth data tracks) in order to detect a corresponding third data sequence. In one embodiment, the branch metric of the DTI and ITI trellis type sequence detector 70 is computed based on:

$$BM = \|y_i(k) - d_i - \alpha d_{i-1} - \beta d_{i+1}\|^2$$

where $y_i(k)$ represents the current read signal sample, $d_i$ represents an expected sample corresponding to the branch, $d_{i-1}$ represents an expected sample corresponding to a bit in a data sequence detected in the adjacent data track preceding the target data track (second data track), and $d_{i+1}$ represents an expected sample corresponding to a bit in a data sequence detected in the adjacent data track following the target data track (fourth data track). The scalar $\beta$ is configured to account for the radial spacing of the adjacent data track and may be calibrated similar to the scalar $\alpha$ as describe above.

In one embodiment, the data recorded in both the third and fourth data tracks of FIG. 5C may be accurately detected during a single revolution of the disk. In another embodiment, if one of the data sequences is unrecoverable during a first revolution, whereas the other data sequence is recoverable during the first revolution, the recovered data sequence may be used during a second revolution to assist in accurately detecting the other data sequence using the DTI and ITI trellis type sequence detector. Accordingly, in one embodiment the throughput of the disk drive may be as high as two data tracks read for each disk revolution.

Figure 6A:
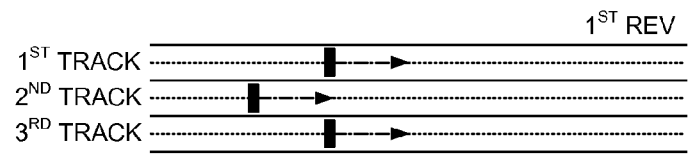
FIGS. 6A-6D show an embodiment wherein three read elements may be used to read three data tracks at a time, wherein one, two, or three data sequences may be detected during a single revolution of the disk.

FIG. 6A shows an embodiment wherein the head comprises a first read element positioned over a first data track, a second read element positioned over a second data track, and a third read element positioned over a third data track. During a first revolution of the disk, DTI trellis type sequence detectors may be used to detect a first data sequence from the first data track and a second data sequence from third data track. Both of these sequences may then be converted into expected samples used by a DTI and ITI trellis type sequence detector to detect a third data sequence from the second data track. Similar to the embodiment described above, the data sequences may be accurately detected for one or more of the data tracks, wherein the accurately detected data sequences may be used to detect the other data sequences during subsequent revolutions of the disk.

Figure 6B:
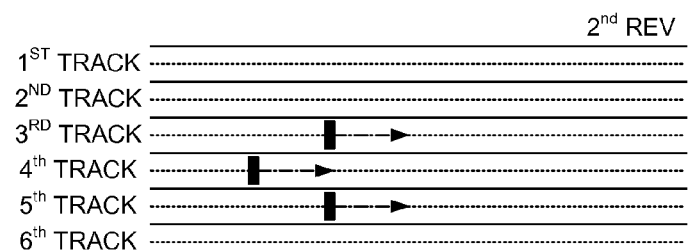

FIG. 6B shows an embodiment wherein the data sequences for the first and second data tracks have been accurately recovered. The first read element is positioned over the third data track, the second read element is positioned over the fourth data track, and the third read element is positioned over the fifth data track. During a second revolution of the disk, the data sequence detected from the second data track, as well as the data sequence detected from the fourth data track may be converted into expected samples and used to detect the data sequence in the third data track. A DTI trellis type sequence detector may also attempt to detect a data sequence from the fifth data track, which may be converted into expected samples and used to detect the data sequence in the fourth data track.

Figure 6C:
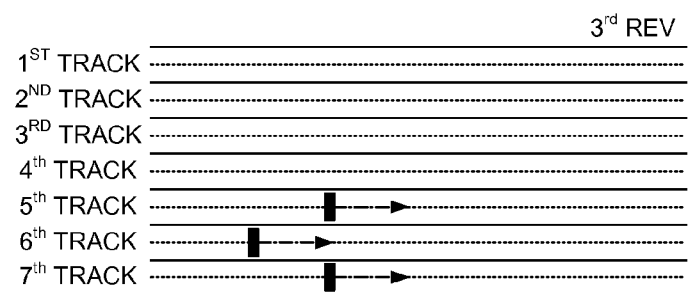
Figure 6D:
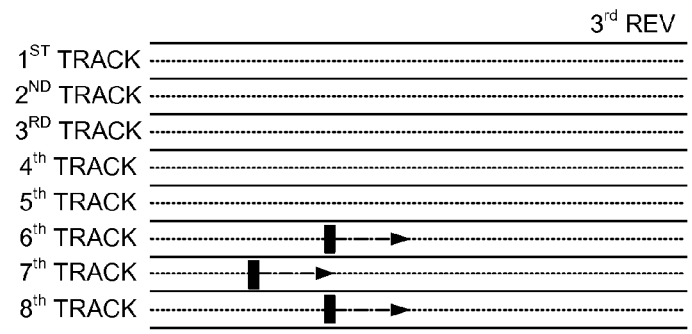

FIG. 6C shows an embodiment wherein the data sequences for the third and fourth data tracks are accurately detected during the second revolution (FIG. 6B), and therefore the read elements are shifted down by two data tracks for the next revolution. FIG. 6D shows an embodiment wherein the data sequences for the third, fourth, and fifth data tracks are accurately detected during the second revolution (FIG. 6B), and therefore the read elements are shifted down by three data tracks for the next revolution. Accordingly in this embodiment the throughput of the disk drive may be as high as three data tracks read for each disk revolution.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a disk comprising a plurality of data tracks;
    a head actuated over the disk; and
    control circuitry configured to:
        read a first data track to generate a first read signal;
        sample the first read signal to generate first read signal samples;
        detect a first data sequence based on the first read signal samples;
        filter the first data sequence with a target partial response to convert the first data sequence into corresponding first expected samples;
        read a second data track adjacent the first data track to generate a second read signal;
        sample the second read signal to generate second read signal samples; and
        detect a second data sequence based on the second read signal samples and the first expected samples.

2. The data storage device as recited in claim 1, wherein the head comprises:
    a first read element for positioning over the first data track to generate the first read signal; and
    a second read element for positioning over the second data track to generate the second read signal.

3. The data storage device as recited in claim 2, wherein the control circuitry is configured to generate the first read signal and the second read signal during a single revolution of the disk.

4. The data storage device as recited in claim 2, wherein the control circuitry is further configured to:
    detect the first data sequence using a downtrack interference (DTI) trellis type sequence detector; and
    detect the second data sequence using a DTI and intertrack interference (ITI) trellis type sequence detector.

5. The data storage device as recited in claim 4, wherein the DTI and ITI trellis type sequence detector is configured to generate a branch metric of a trellis based on at least one of the first expected samples and a DTI expected sample.

6. The data storage device as recited in claim 5, wherein the control circuitry is further configured to:
    scale the at least one of the first expected samples to generate a scaled expected sample; and
    generate the branch metric of a trellis based on the scaled expected sample and the DTI expected sample.

7. The data storage device as recited in claim 1, wherein the control circuitry is further configured to:
    read a third data track adjacent the first data track to generate a third read signal;
    sample the third read signal to generate third read signal samples;
    detect a third data sequence based on the third read signal samples;
    convert the third data sequence into corresponding second expected samples; and
    detect the second data sequence based on the second read signal samples, the first expected samples, and the second expected samples.

8. The data storage device as recited in claim 7, wherein the head comprises:
    a first read element for positioning over the first data track to generate the first read signal;
    a second read element for positioning over the second data track to generate the second read signal; and a third read element for positioning over the third data track to generate the third read signal.

9. The data storage device as recited in claim 8 wherein the control circuitry is configured to generate the first read signal, the second read signal, and the third read signal during a single revolution of the disk.

10. The data storage device as recited in claim 1, wherein the control circuitry is further configured to:
read the first data track to generate the first read signal and detect the first data sequence during a first revolution of the disk;
store the first data sequence; and
read the second data track to generate the second read signal and detect the second data sequence during a second revolution of the disk based on the stored first data sequence.

11. The data storage device as recited in claim 1, wherein the control circuitry is further configured to detect the second data sequence using a downtrack interference (DTI) and intertrack interference (ITI) trellis type sequence detector.

12. A method of operating a disk drive, the method comprising:
reading a first data track of a disk to generate a first read signal;
sampling the first read signal to generate first read signal samples;
detecting a first data sequence based on the first read signal samples;
filtering the first data sequence with a target partial response to convert the first data sequence into corresponding first expected samples;
reading a second data track of the disk adjacent the first data track to generate a second read signal;
sampling the second read signal to generate second read signal samples; and
detecting a second data sequence based on the second read signal samples and the first expected samples.

13. The method as recited in claim 12, further comprising:
positioning a first read element over the first data track to generate the first read signal; and
positioning a second read element over the second data track to generate the second read signal.

14. The method as recited in claim 13, further comprising generating the first read signal and the second read signal during a single revolution of the disk.

15. The method as recited in claim 13, further comprising:
detecting the first data sequence using a downtrack interference (DTI) trellis type sequence detector; and
detecting the second data sequence using a DTI and intertrack interference (ITI) trellis type sequence detector.

16. The method as recited in claim 15, wherein the DTI and ITI trellis type sequence detector is configured to generate a branch metric of a trellis based on at least one of the first expected samples and a DTI expected sample.

17. The method as recited in claim 16, further comprising:
scaling the at least one of the first expected samples to generate a scaled expected sample; and
generating the branch metric of a trellis based on the scaled expected sample and the DTI expected sample.

18. The method as recited in claim 16, further comprising:
reading a third data track of the disk adjacent the first data track to generate a third read signal;
sampling the third read signal to generate third read signal samples;
detecting a third data sequence based on the third read signal samples;
converting the third data sequence into corresponding second expected samples; and
detecting the second data sequence based on the second read signal samples, the first expected samples, and the second expected samples.

19. The method as recited in claim 18, further comprising:
positioning a first read element over the first data track to generate the first read signal;
positioning a second read element over the second data track to generate the second read signal; and
positioning a third read element over the third data track to generate the third read signal.

20. The method as recited in claim 19, further comprising generating the first read signal, the second read signal, and the third read signal during a single revolution of the disk.

21. The method as recited in claim 12, further comprising:
reading the first data track to generate the first read signal and detect the first data sequence during a first revolution of the disk;
storing the first data sequence; and
reading the second data track to generate the second read signal and detect the second data sequence during a second revolution of the disk based on the stored first data sequence.

22. The method as recited in claim 12, further comprising detecting the second data sequence using a downtrack interference (DTI) and intertrack interference (ITI) trellis type sequence detector.

23. Control circuitry configured to:
read a first data track of a disk to generate a first read signal;
sample the first read signal to generate first read signal samples;
detect a first data sequence based on the first read signal samples;
filter the first data sequence with a target partial response to convert the first data sequence into corresponding first expected samples;
read a second data track of the disk adjacent the first data track to generate a second read signal;
sample the second read signal to generate second read signal samples; and
detect a second data sequence based on the second read signal samples and the first expected samples.

* * * * *